US012794535B2

(12) United States Patent
Hewavithana et al.

(10) Patent No.: US 12,794,535 B2
(45) Date of Patent: Nov. 10, 2026

(54) OPTIMIZING SPECTRAL EFFICIENCY IN A 5G MASSIVE MIMO SPLIT ARCHITECTURE

(71) Applicant: Intel Corporation, Santa Clara, CA (US)

(72) Inventors: Thushara Hewavithana, Tempe, AZ (US); Ranjit Cavatur, San Marcos, CA (US); Neelam Chandwani, Portland, OR (US); Ziyi Li, Beijing (CN); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 18/548,942

(22) PCT Filed: Mar. 29, 2022

(86) PCT No.: PCT/US2022/022238
§ 371 (c)(1),
(2) Date: Sep. 5, 2023

(87) PCT Pub. No.: WO2022/265713
PCT Pub. Date: Dec. 22, 2022

(65) Prior Publication Data

US 2024/0056159 A1 Feb. 15, 2024

(30) Foreign Application Priority Data

Jun. 16, 2021 (WO) ................ PCT/CN2021/100458

(51) Int. Cl.
*H04B 7/06* (2006.01)
*H04B 17/336* (2015.01)

(52) U.S. Cl.
CPC ......... *H04B 7/0695* (2013.01); *H04B 7/0617* (2013.01); *H04B 17/336* (2015.01)

(58) Field of Classification Search
CPC ... H04B 7/0695; H04B 17/336; H04B 7/0617
See application file for complete search history.

(56) References Cited

U.S. PATENT DOCUMENTS

| | | | | |
|---|---|---|---|---|
| 7,339,979 B1 * | 3/2008 | Kelkar | ................. | H04B 7/0617 375/267 |
| 9,559,417 B1 * | 1/2017 | Schwarzwalder | ... | H01Q 3/2605 |

(Continued)

FOREIGN PATENT DOCUMENTS

| | | | | |
|---|---|---|---|---|
| EP | 3276846 A1 | 1/2018 | | |
| EP | 3997802 B1 * | 4/2026 | ........... | H04B 7/0641 |
| KR | 101989507 B1 * | 6/2019 | ........... | H04B 7/0695 |

OTHER PUBLICATIONS

O-Ran Alliance; “Control, User and Synchronization Plane Specification”; Technical Specification; O-RAN Working Group 4 (Open Fronthaul Interfaces WG); O-RAN-WG4.CUS.0-v08.00 (Mar. 2022), available at https://specifications.o-ran.org/download?id=219.

(Continued)

*Primary Examiner* — Rebecca E Song
*Assistant Examiner* — Shu Liu
(74) *Attorney, Agent, or Firm* — Viering, Jentschura & Partner mbB

(57) ABSTRACT

This disclosure relates to apparatuses, systems, and methods for scheduling user equipment (UE) transmissions, and in particular for scheduling UE transmissions in a 5G New Radio system with a split architecture. The scheduler selects a beamforming algorithm for a UE group that includes a first UE and a second UE, where the beamforming algorithm is based on characteristics of the beamforming algorithm and/or the UE group. The scheduler determines an effective SINR for the UE group based on the beamforming algorithm and determines a summed proportion fair metric for the UE group based on the effective SINR for the UE group. The scheduler schedules a transmission for either the first UE or (Continued)

the UE group, based on a proportional fair metric for the first UE and the summed proportional fair metric for the UE group.

19 Claims, 8 Drawing Sheets

(56) References Cited

U.S. PATENT DOCUMENTS

| | | | | |
|---|---|---|---|---|
| 2012/0281639 | A1* | 11/2012 | Acharya | H04B 7/0452 370/329 |
| 2013/0022141 | A1* | 1/2013 | Song | H04B 7/0617 375/260 |
| 2017/0063438 | A1* | 3/2017 | Baik | H04B 7/0617 |
| 2017/0208613 | A1* | 7/2017 | Nam | H04B 7/0481 |
| 2017/0230910 | A1* | 8/2017 | Kimura | H04B 7/022 |
| 2017/0265145 | A1 | 9/2017 | Benjebbour et al. | |
| 2017/0324455 | A1* | 11/2017 | Soriaga | H04B 7/0456 |
| 2018/0098333 | A1 | 4/2018 | Bachu et al. | |
| 2018/0352526 | A1 | 12/2018 | Frenger et al. | |
| 2019/0239098 | A1 | 8/2019 | Lee et al. | |
| 2019/0305836 | A1* | 10/2019 | Kapetanovic | H04B 7/0695 |
| 2021/0007120 | A1 | 1/2021 | Kalyanasundaram et al. | |
| 2021/0266049 | A1* | 8/2021 | Kuchi | H04B 7/0632 |
| 2021/0385686 | A1* | 12/2021 | Ahmed | H04W 28/06 |
| 2022/0312404 | A1* | 9/2022 | Chopra | H04W 72/044 |
| 2023/0254029 | A1* | 8/2023 | Huang | H04B 7/063 370/329 |
| 2024/0204830 | A1* | 6/2024 | Pjanic | H04L 25/03891 |

OTHER PUBLICATIONS

International Search Report for corresponding International Application No. PCT/US2022/022238, dated Jul. 13, 2022, 4 pages (for informational purposes only).

Quintuna Rodriguez, Veronica et al., "Cloud-RAN Factory: Instantiating virtualized mobile networks with ONAP", arXiv:2011.02699v1, dated Nov. 5, 2020, 4 pages.

* cited by examiner

300

OPTIMIZING SPECTRAL EFFICIENCY IN A 5G MASSIVE MIMO SPLIT ARCHITECTURE

PRIORITY

This application is a national phase of PCT/US2022/022238, filed on Mar. 29, 2022, which claims priority to a China PCT Patent Application PCT/CN2021/100458, filed Jun. 16, 2021, both of which are is-incorporated herein by reference in its their entirety.

TECHNICAL FIELD

This disclosure generally relates to apparatuses, systems, and methods for wireless communications, and in particular to a system level solution for optimizing spectral efficiency of a base station operating in a fifth generation (5G) massive multiple input multiple output (MIMO) system with a split radio and baseband processing architecture.

BACKGROUND

A current trend in the wireless industry has been to move to a centralized radio access network (RAN) architecture. A centralized RAN (C-RAN) architecture may present problems for communications for massive MIMO in 5G New Radio (NR), an in particular, for uplink transmissions from user equipment (UEs) to the base station.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
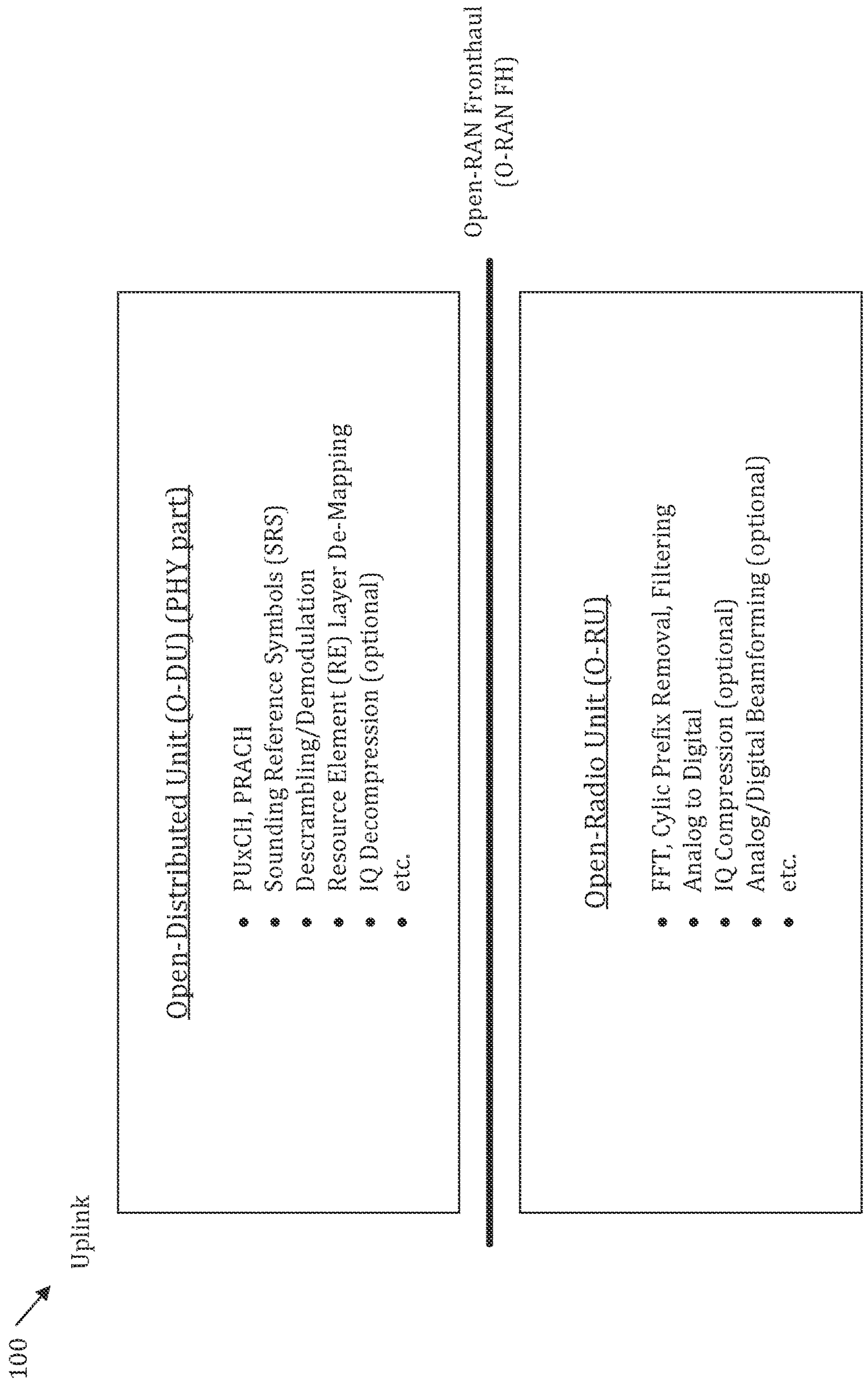
FIG. 1 depicts a 7-2 split architecture between an open-RAN radio unit (O-RU) and an open-RAN distributed unit (O-DU) according to the open-RAN (O-RAN) standard.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11 ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

As the wireless industry continues to move to a centralized radio access network (C-RAN) architecture, this centralized RAN architecture may present problems for uplink (UL) communication with massive MIMO in 5G New Radio (NR). Disclosed below is a spectral optimization system that may optimize spectral efficiency in a multiuser multiple input multiple output (MU-MIMO) architecture, where the architecture may have certain constraints. In a C-RAN architecture, the radio and analogue/digital front-end hardware of the base station (BS) may be deployed close to the user equipment (UE), whereas the upper physical layer (PHY) processing may be centralized to a more convenient location that is separated from the location of the BS. The disclosed spectral optimization system may provide ease of scalability of the network, cost savings (e.g., by consolidating multiple cells into one site), and improved coordination between neighboring cells (e.g., reduce interference, etc.) in a split radio/BS architecture in 5G NR.

FIG. 1 shows a basic lower layer uplink functionality in a split radio/BS architecture in 5G NR that is based on the open RAN (O-RAN) standard. In particular, FIG. 1 shows an O-RAN conforming BS architecture 100, where an O-RAN radio unit (O-RU) and an O-RAN distributed unit (O-DU) are partitioned according to a 7-2 split, as provided by the O-RAN standard. See, for example, *Control, User and Synchronization Plane Specification*, O-RAN Working Group 4 (Open Fronthaul Interface WG), O-RAN-WG4.CUS.0-v08.00 (Nov. 11, 2021). For the uplink, the O-RU provides radio functions that may include OFDM phase compensation, FFT, cyclic prefix (CP) removal, filtering, IQ compression, beamforming, etc. The rest of the physical layer (PHY) functions, including, as examples, PUxCH, PRACH, sounding reference symbols (SRS), descrambling, demodulation, resource element layer demapping, equalization, de-matching, and de-coding may reside in the O-DU.

Traditional telecom equipment manufacturers (TEMs) have long being pushing against the O-RAN 7-2 split architecture because the architecture may open the marketplace to a wider pool of RAN ecosystem vendors, which may be viewed as a threat to the TEMs' appliance-based BS solutions. Other criticisms may be more technical in nature, where one of the main technical points against the O-RAN 7-2 split architecture is that it may have ~10 dB signal-to-noise-ratio (SNR) loss, leading to a loss in spectral efficiency (SE), especially in high mobility scenarios.

Figure 2:
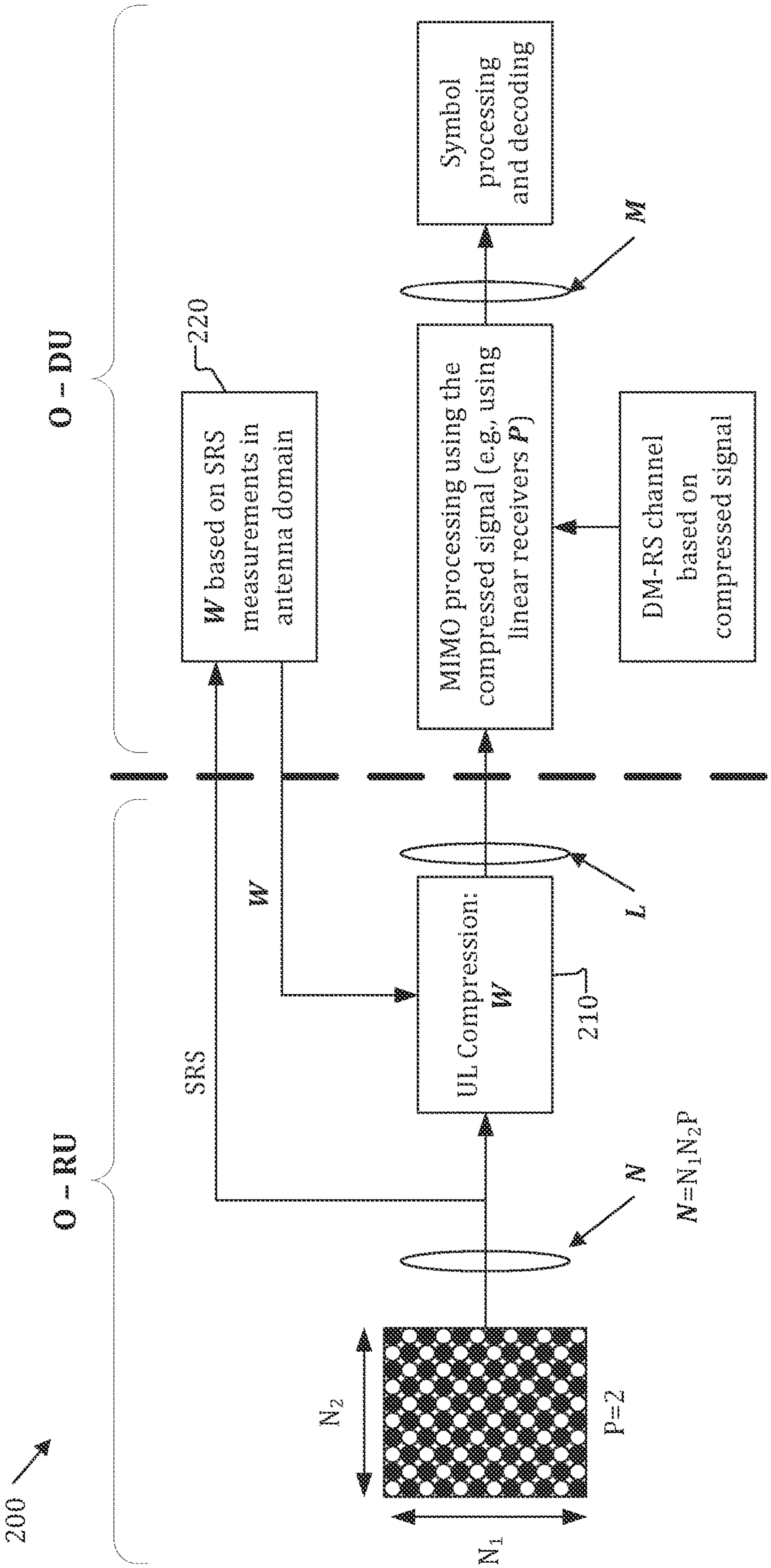
FIG. 2 shows exemplary implementation of an uplink (UL) processing chain in an O-RAN 7-2 split architecture.

FIG. 2 shows an exemplary implementation of an uplink (UL) processing chain 200 in an O-RAN 7-2 split architecture. As should be appreciated from FIG. 2, N indicates the number of dedicated transceiver units (TXRUs) in the antenna domain); L indicates the number of fronthaul (FH) streams in the beam domain; M indicates the number of MIMO layers; $N_1$ indicates the number of TXRUs in elevation; $N_2$ indicates the number of TXRUs in azimuth; and P indicates the number of TXRUs in the polarization dimension. As should also be understood from UL processing chain 200, the received signal in the antenna domain may be given by the following formula:

$$r = (h_1 \quad h_2 \quad \ldots \quad h_m) \cdot s + z$$

The received signal after O-RU compression may be given by the following formula:

$$y = W \cdot r$$

The received signal after linear combination at the O-DU may be given by the following formula:

$$\hat{s} = P \cdot y$$

The UL compression module 210 in the O-RU may simply apply the beam forming weights provided by the O-DU (in 220) to compress the N number of antenna streams into L output streams. This is to reduce the fronthaul (FH) data rate. The beamforming weights, W, used in the UL compression module 210 may be calculated by the O-DU (in 220) using the sounding reference symbol (SRS)-based channel estimations (CE). The L data streams arriving at the O-DU may be MU-MIMO combined using, as examples, a minimum mean square error-interference rejection combining (MMSE-IRC) algorithm or a mean square error-maximal ratio combining (MMSE-MRC) algorithm, which may perform channel estimation based on demodulator reference symbol (DM-RS). SRS periodicity may be generally kept high (e.g. on the order of 5 ms) as compared to the UL slot period (e.g. 0.5 ms) to reduce pilot overhead, whereas DM-RS occurs in every slot. Therefore, the SRS-based channel estimates may tend to be less accurate (e.g., in terms of tracking time variations, etc.) as compared to DM-RS channel estimation. Such beam compression that uses SRS CE-based weights may lead to loss of information in the O-RU during the compression process. This loss of information may be a function of the beam compression algorithm that has been used, which UEs have been grouped together for the transmission, and/or any number of other factors which may be discussed in more detail below. Indeed, the SNR loss of −10 dB mentioned above may be related to the use of SRS CE-based weights in the O-RU.

The spectral optimization system described herein may improve these losses (e.g., by using an optimizable scheduler algorithm). Certain objectives of the spectral optimization system may include, as examples, avoiding wireless performance loss as compared to conventional integrated architectures, so that there is no or only negligible spectrum efficiency penalty for using an O-RAN 7-2 split architecture; keeping fronthaul throughput under control by, for example, imposing a maximum number of streams from the O-RU to the O-DU (e.g., 16 for 8 layers); scaling down the number of streams as the number of layers is reduced; maintaining computational complexity to be on the same order as conventional systems; and/or enabling an optional tradeoff between SE complexity and fronthaul throughput.

Massive MIMO medium access control (MAC) schedulers may take advantage of spatial multiplexing by selecting multiple users who share the same resource in the frequency domain. This may be done for both UL scheduling and DL scheduling. While the focus of the disclosure below is on massive MIMO for UL scheduling, the concepts discussed below are equally applicable to downlink scheduling and should be understood to encompass the same.

Figure 3:
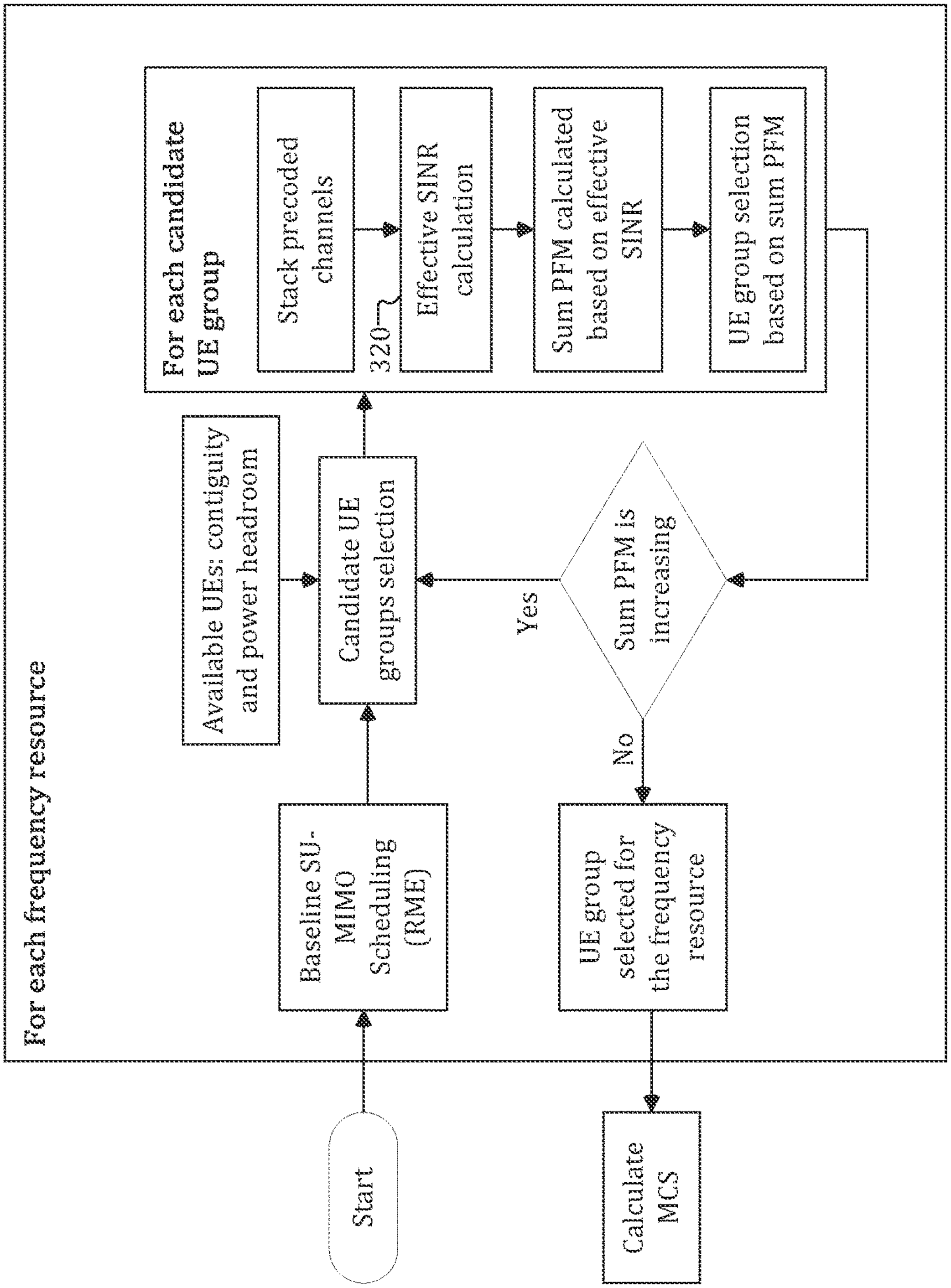
FIG. 3 shows a flow diagram of a baseline algorithm for an uplink multiuser multiple input multiple output (MU-MIMO) scheduler for 5G NR.

FIG. 3 shows a baseline flow diagram for an UL MU-MIMO scheduler algorithm 300. The scheduler algorithm 300 may allocate contiguous physical resource blocks (PRBs) to multiple users in a way that may respect the power constraints of each user while at the same time may strive to provide the best resources to the user in terms of estimated channel quality. For each frequency resource, the scheduler algorithm 300 may determine a baseline single-user (SU)-MIMO scheduling block for a given UE. Next, the scheduler algorithm 300 may consider grouping the scheduled UE with other candidate UEs by constructing a set of MU-MIMO candidate UE groups by adding another UE to the scheduled SU-MIMO UE. The scheduler algorithm 300 may consider each remaining candidate UE, selecting the best UE candidate for the potential UE grouping based on a summed proportional fair (PF) metric (PFM) that it calculates for the potential UE grouping. If the summed PFM of the potential UE grouping is less than the PFM of the scheduled SU-MIMO UE, the algorithm may decline to form the potential UE grouping and simply schedule the SU-MIMO transmission for the given UE. If, however, the summed PFM of the potential UE grouping is larger than the PFM of the scheduled SU-MIMO UE, this indicates the scheduler algorithm 300 may improve PFM by using a MU-MIMO transmission according to the potential UE grouping. The scheduler algorithm 300 may then repeat its consideration of the remaining candidate UEs, selecting the best UE candidate for adding to the UE grouping, and then determining the PFM sum for this further potential grouping. If this further potential grouping has an improved PFM sum, the process may continue to find yet another candidate UE for potentially further expanding the grouping until the PFM sum is no longer improving.

Of course, if the UE group has already reached the maximum number of layers allowed (e.g. 8), the scheduler algorithm 300 may schedule this UE group and then proceed with scheduling the remaining UEs on another PRB. If the UE group has not reached the maximum number of layers allowed, the scheduler algorithm 300 may continue to consider adding other candidate UEs to the group based on the (increasing) PFM, following the same process described above. In this manner, the scheduler algorithm 300 continues the UE grouping process until the UE group reaches the maximum number of UEs (e.g., maximum number of layers) or the PFM sum shows a decline in the PFM sum from the previous potential grouping to the PFM sum for the current potential grouping. Once the scheduler algorithm 300 completes the grouping process, the group is scheduled, and the scheduler algorithm 300 may repeat the grouping process using a new UE and groupings with remaining candidate UEs until all candidate UEs have been scheduled.

In conventional scheduling algorithms, scheduling usually assumes that combining will follow a predetermined MIMO beamforming algorithm in the BS. The conventional scheduler will then mimic this predetermined algorithm in deterministic form to calculate the effective SINR for each potential UE grouping (e.g., in effective SINR calculation 320). Unlike the improved scheduling algorithm used by the spectral optimization system described below, the effective SINR calculation of a conventional scheduler may not consider any potential SNR losses due to mobility of the UEs due to the split architecture when beamforming. Conventional algorithms may also assume a single step MIMO combination of antenna streams to obtain the transmit layers. But such assumptions may be invalid for a split O-RAN-based architecture, where the massive MIMO UL MIMO combining may be split between the O-RU and O-DU. Furthermore, depending on mobility of UEs and the specific beamforming algorithms employed, a split architecture may result in an SNR loss (dSNR) as compared to that of an integrated architecture. For comparison purposes, the performance of an integrated architecture may be used as a reference point for comparison to the performance of a split architecture. In this regard, the performance of an integrated architecture may be referred to herein as a "reference performance."

The spectral optimization system disclosed herein may involve one or more of the following features and/or benefits: (1) a resource allocation and scheduling framework that uses mobility characteristics of UEs to assist in determining MU order (e.g., number of layers); (2) optimizing the selection of a beam compression algorithm (e.g., selection of a beamforming algorithm) for a given UE grouping through a joint optimization of spectral efficiency and beam compression; (3) achieving spectral efficiency for an O-RAN 7-2 split architecture implementation that has performance parity with other types of architectural implementations (e.g., an integrated architecture); and (4) enabling a mechanism for configuring tradeoffs among spectral efficiency, receiver complexity, or/and fronthaul throughput.

Figure 4:
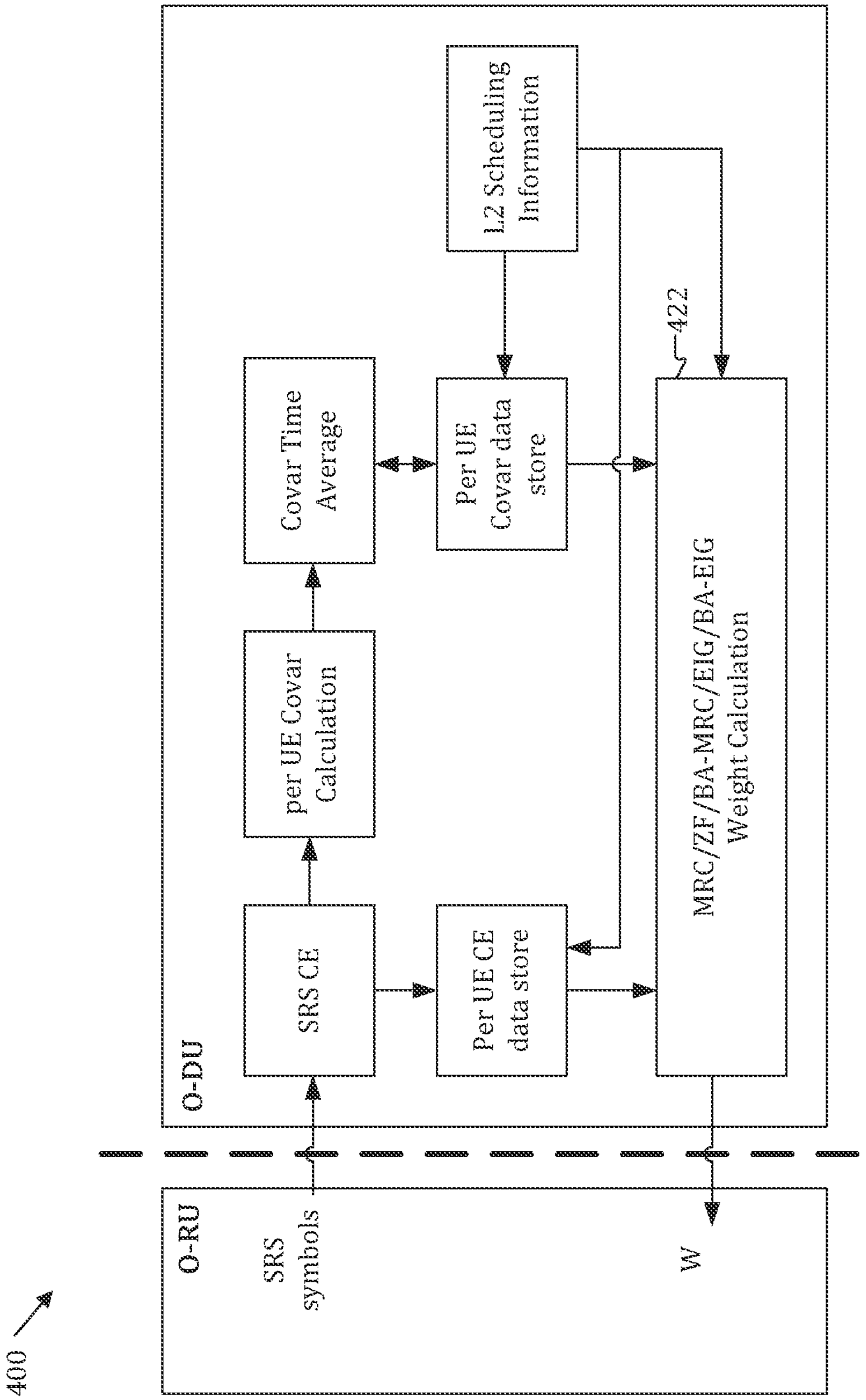
FIG. 4 depicts a block diagram of an exemplary UL beam compression weight calculation in layer one (L1) of 5G NR.

As discussed in more detail below, the disclosed spectral optimization system may provide a system level solution for massive MIMO UL spectrum efficiency optimization in O-RAN 7-2 split architecture. As shown in FIG. 4, for example, beam compression for layer 1 in the O-DU for architecture 400 need not be not based on a single, fixed beamforming algorithm, but rather, the O-DU may select (in 422) the beamforming algorithm from a number of different beam compression algorithms, depending on UE conditions and other factors. For example, in addition to data the O-DU may derive (e.g., per UE CE data and/or per UE covariance data) from the SRS symbols received from the O-RU, the layer 2 scheduling information may provide parameters used for selecting (in 422) the beam compression algorithm. Such parameters may include, for example, the number of output streams. As a result, the overall spectral optimization system may be a joint optimization of UL beam compression and scheduling to meet key performance indicators (PKIs), including, for example, spectrum efficiency, complexity, and fronthaul throughput, as described in more detail below.

The different beam compression algorithms may be understood as a suite of candidate beamforming algorithms that may be implemented in the PHY layer, where each candidate algorithm may be identified as having certain characteristics associated with key performance indicators. These characteristics for each algorithm may be based on predetermined empirical data (e.g., measurements, simulation, etc. for the algorithm), and/or may be updated over time (e.g., in real time) while the spectral optimization system is up and running in an actual implementation. The updates to the characteristics may be determined from, for example, a packet error rate that may be monitored at the O-DU.

Examples of key performance indicators for which characteristics of each beam compression algorithm may be maintained may include, as examples, SNR loss against baseline channel quality indicator (CQI) (e.g. SINR), FH throughput (e.g., the number of output streams), computation complexity, etc. The independent variables that may be used to characterize key performance indicators may include number of layers, mobility of UEs, dominant interferers, etc. A multi-dimensional function may capture the key performance indicators against the independent variables for each of the different candidate beamforming algorithms in the suite of available algorithms. One example of such a relationship is given in the formula below:

$$(dSNR, \text{Number\_of\_Streams}, \text{Compute\_Complexity}) = \text{f\_algoID}(\text{Number\_of\_Layers}, \text{UE\_Mobility}, \text{Interference})$$

These per algorithm key performance indicator functions may be implemented as look up tables. For example, Table 1 below provides an exemplary subset of a lookup table for various baseline and channel aggregation-based candidate beam compression algorithms. The available beamforming algorithms may include maximum ration combining (MRC), zero-forcing (ZF), discrete Fourier transform (DFT), block adaptive maximum ratio combining (BA-MRC), or block adaptive eigenspace beamforming, just to name a few.

TABLE 1

Performance characterization of candidate beam compression algorithms

| Doppler | | | Mobility Low: 10 Hz | Mobility Medium: 100 Hz | Mobility High: 400 Hz | Dominant Interference |
|---|---|---|---|---|---|---|
| Baseline Algorithms | MRC | SU | <1 dB | <9 dB | — | <4 dB |
| | | MU | <1 dB | <15 dB | — | <2 dB |
| | ZF | SU | <1 dB | <9 dB | — | <4 dB |
| | | MU | <1 dB | <16 dB | — | <2 dB |
| | DFT | SU | <1 dB | <1 dB | — | <2 dB |
| | | MU | <4 dB | <4 dB | — | <4 dB |
| Channel Aggregation Based Algorithms | BA-MRC | SU | — | <1 dB | — | <2 dB |
| | | MU | — | <4 dB | — | — |
| | BA-EIG* | SU | <1 dB | <1 dB | <1 dB | <2 dB |
| | | MU | <1 dB | <1 dB | <1 dB | <2 dB |
| | DFT | SU | — | Similar to baseline DFT | | |
| | | MU | — | Similar to baseline DFT | | |

As should be appreciated, the lookup table of Table 1 is merely an exemplary subset, and a lookup table may have additional entries (e.g., for additional beamforming algorithms) and additional dimensions for any number of characteristics associated with the available beamforming algorithms, including, for example, the number of layers, the number of output streams, and any other types of characteristics that may relate to key performance indicators (e.g., computational complexity, FH throughput (e.g., number of output streams), etc.) according to the extent of characterization desired/available for each candidate algorithm. The spectral optimization system may store such a lookup table in a memory, which may be updated as needed. As should also be appreciated, beamforming algorithm characteristics may include MIMO beamforming characteristics, wideband beamforming characteristics, and/or narrowband beamforming characteristics. For example, beamforming may be implemented on narrowband signals such that the beamformed narrowband signal may produce a high signal strength as compared to the noise level at the receiving antenna. Similarly, beamforming may be implemented on wideband signals such that the wideband beamformed signal may produce a high signal strength as compared to the noise level at the receiving antenna. Beamforming may be implemented on MIMO signals such that the beamformed signal may produce a high signal strength as compared to the noise level at the receiving antenna.

The disclosed spectral optimization system may include a layer 2 scheduling algorithm that incorporates these beamforming performance characteristics in order to optimize scheduling according to different optimization targets. For example, the layer 2 scheduling algorithm may optimize for spectral efficiency by, for example, selecting the algorithm with the lowest SNR loss within the allowed number of streams and complexity bounds. As another example, the layer 2 scheduling algorithm may optimize for complexity by, for example, selecting the lowest complexity solution that satisfies acceptable performance levels for other key performance indicators. As another example, the layer 2 scheduling algorithm may optimize for FH throughput by, for example, selecting the algorithm with lowest FH throughput and best performance levels for other key performance indicators. As another example, the layer 2 scheduling algorithm may balance any performance levels for any of the key performance indicators. In other words, the optimization target may be to balance a sufficient performance level for spectral efficiency with a reasonable computational complexity and satisfactory FH throughput. As should be appreciated, different weights may be given to the different characteristics/key performance indicators, depending on the planned deployment scenario and potential use cases. To implement such optimizations, the disclosed layer 2 scheduler may follow the baseline scheduler shown in FIG. 3 using an enhanced module for determining the effective SINR calculation, as shown in FIG. 5.

Figure 5:
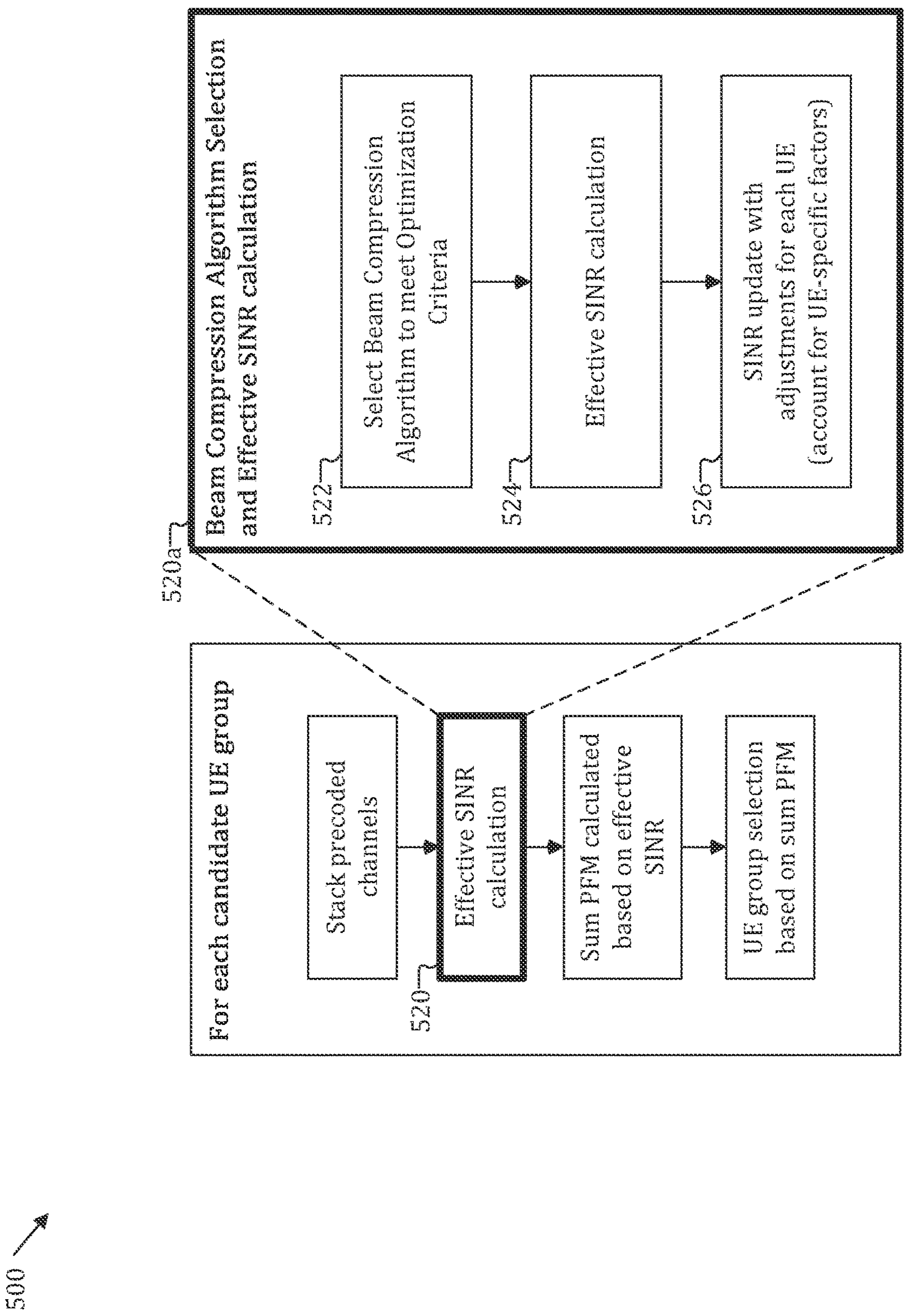
FIG. 5 shows exemplary enhancements to a UL scheduler that may select the best beam compression algorithm and may enhance signal-to-interference-plus-noise-ratio (SINR) calculations for optimized spectral efficiency.

FIG. 5 shows a portion of an enhanced scheduling algorithm 500 that may improve on the baseline scheduler algorithm 300 of FIG. 3. Scheduling algorithm 500 may follow the same baseline process discussed above with respect to baseline scheduler algorithm 300, except that the effective SINR calculation (e.g., effective SINR calculation 320) may be replaced with an improved effective SINR calculation (e.g., 520 effective SINR calculation) that may include a joint beam compression algorithm selection and effective SINR calculation block 520*a*. The joint beam compression algorithm selection and effective SINR calculation block 520*a* may jointly select a beam compression algorithm and calculate the effective SINR calculation so as to optimize spectral efficiency. In such a manner, for the given PRB and for the potential UE grouping(s), the spectral optimization system may, based on the mobility of the UEs, evaluate each of the available beam compression algorithms in the L1 toolbox to determine the SNR loss against the number of output layers and the resulting complexity of beamform weight calculation in order to, in 522, select a beam compression to meet a predetermined optimization target.

Given that at least one of the beamforming algorithms in the L1 toolbox may provide performance parity with the reference performance of an integrated architecture, scheduling algorithm 500 may be able to select a candidate algorithm from the L1 toolbox that gives performance parity with the reference performance of an integrated architecture so as to avoid spectrum efficiency losses in an O-RAN 7-2 implementation as compared to conventional integrated base station architectures. Nevertheless, scheduling algorithm 500 may choose a beam compression algorithm that may not necessarily provide performance parity with the reference performance of an integrated architecture in order to, for example, optimize/adjust for other performance indicators such as computational complexity, FH throughput, and/or combinations thereof. For example, low-power deployments may have a scheduler that prioritizes a balance between spectral efficiency and power consumption (e.g., a reasonable spectral efficiency for the lowest power consumption cost). Depending on the UE grouping, UE mobility characterization, number of output streams, interference levels, etc., the scheduling algorithm 500 may choose, for each different PRB, different beamforming algorithms to meet the target optimization criteria.

Once scheduling algorithm 500 has selected a beam compression algorithm (e.g., a beamforming algorithm) in 522 that meets the target optimization criteria, scheduling algorithm 500 may calculate, in 524, an effective SINR based on the selected beam compression algorithm. Next, in 526, the scheduling algorithm 500 may adjust the calculated SINR based on the resulting dSNR for each UE. Unlike conventional implementations that may fine-tune the SINR calculation (and MCS assignment) as a result of link adaptation process, which may be slow and less effective for burst traffic situations, the scheduling algorithm 500 may fine-tune the SINR calculation as a per-UE adjustment (e.g., in 526), in order to reduce dependency on slower and less effective link adaptation. In other words, the adjustment in 526 may correct for SINR calculation inaccuracies related to O-RAN 7-2 architecture and associated scheduling and beamforming algorithms.

Once scheduling algorithm 500 determines the appropriate UE groupings and beam compression algorithm for each frequency resource, this information may be passed on to the layer L1 beamforming algorithm (e.g., from 422 in FIG. 4) to select the correct beamforming weights when the signal corresponding to that frequency resource arrives at BS. As should be understood, scheduling (UE grouping, determining beamforming algorithm, calculating weights, etc.) may occur one time slot before the data is actually scheduled to use the uplink, where the BS may inform each UEs of its allocated resources (e.g., via a control channel). Then, the UEs will transmit data in the UL on their allocated resource (s). The BS, having already performed the scheduling, will know which UE pairing, beamforming algorithm, etc. corresponds to each frequency resource.

In this manner, scheduling algorithm 500 may achieve—in a 7-2 split architecture— performance parity with an integrated architecture, regardless of UE mobility, which may be demonstrated using simulations with well-known traffic models. For example, in a scenario where the DU is implementing one peak cell (e.g., 100 MHz with full spectrum utilization, 8 layers, and higher-order MCS) and two average cells (e.g., 100 MHz with 30% spectrum utilization), and where the UEs are paired with a varying level of MIMO order between 8 and SU, and the MCS varying from high to low, a conventional 7-2 split architecture implementation using ZF beam compression at RU and the baseline scheduler may be able to achieve performance parity with integrated BS implementations only when UE mobility is low. In real-world situations, however, the average cell may have high mobility UEs, and the conventional solution may experience a loss in spectral efficiency and may require high computational cost (e.g., an entire processor core) to calculate the ZF beam weights. By contrast, the disclosed spectral optimization system with a 7-2 split architecture implementation may be able to achieve performance parity with integrated BS implementations regardless of UE mobility, and may be able to do so with a lower computational cost (e.g., 0.8 of a processor core).

Figure 6:
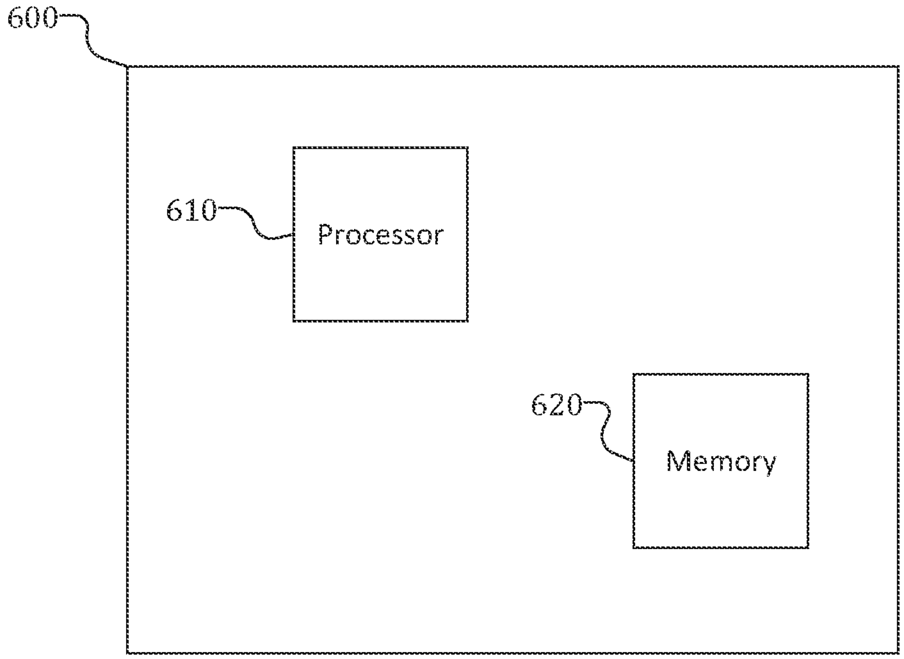
FIG. 6 illustrates an exemplary schematic drawing of a device for optimizing spectral efficiency in a split processing architecture for 5G massive MIMO.

FIG. 6 shows an example of an apparatus 600 that may provide a scheduling algorithm for a spectral optimization system. Without limitation, the apparatus 600 may implement any, some, and/or all of the features described above with respect to architecture 100, processing chain 200, scheduler algorithm 300, architecture 400, scheduling algorithm 500, and/or FIGS. 1-5. FIG. 6 may be implemented as an apparatus, a system, a method, and/or a computer readable medium that, when executed, performs any of the features described above. It should be appreciated that apparatus 600 is merely exemplary, and this example is not intended to limit any of the previously described features.

Apparatus 600 may be an apparatus for scheduling user equipment (UE) transmissions (e.g., in a 5G NR MIMO split architecture system) that may provide spectral optimization. Apparatus 600 includes a processor 610 configured to select a beamforming algorithm for a UE group including a first UE and a second UE, wherein the beamforming algorithm is based on characteristics of the beamforming algorithm and/or the UE group. In addition to or in combination with any of the features described in this or the following paragraphs, processor 610 is also configured to determine an effective SINR for the UE group based on the beamforming algorithm. In addition to or in combination with any of the features described in this or the following paragraphs, processor 610 is also configured to determine a summed proportion fair metric for the UE group based on the effective SINR for the UE group. In addition to or in combination with any of the features described in this or the following paragraphs, processor 610 is also configured to schedule a transmission for either the first UE or the UE group, based on the summed proportional fair metric for the UE group and a proportional fair metric for the first UE.

Furthermore, in addition to or in combination with any one of the features of this and/or the preceding paragraph with respect to apparatus 600, the transmission may include an uplink transmission from at least the first UE to a base station. Furthermore, in addition to or in combination with any one of the features of this and/or the preceding paragraph with respect to apparatus 600, the base station may be part of a split architecture that splits radio hardware from baseband processing. Furthermore, in addition to or in combination with any one of the features of this and/or the preceding paragraph with respect to apparatus 600, the split architecture may include a 7-2 split architecture of an open radio access network (O-RAN). Furthermore, in addition to or in combination with any one of the features of this and/or the preceding paragraph with respect to apparatus 600, wherein processor 610 may be configured to schedule the transmission on a per frequency resource basis. Furthermore, in addition to or in combination with any one of the features of this and/or the preceding paragraph with respect to apparatus 600, processor 610 may be configured to schedule the transmission for either the first UE or the UE group, based on a comparison of the proportional fair metric for the first UE to the summed proportional fair metric for the UE group. Furthermore, in addition to or in combination with any one of the features of this and/or the preceding paragraph with respect to apparatus 600, processor 610 may be configured to determine the comparison.

Furthermore, in addition to or in combination with any one of the features of this and/or the preceding two paragraphs, processor 610 may be configured to schedule the transmission for the first UE if the proportional fair metric is higher than the summed proportional fair metric. Furthermore, in addition to or in combination with any one of the features of this and/or the preceding two paragraphs, processor 610 may be configured to schedule the transmission for the UE group if the summed proportional fair metric is higher than the proportional fair metric. Furthermore, in addition to or in combination with any one of the features of this and/or the preceding two paragraphs, processor 610 may be configured to, if the summed proportional fair metric is higher than the proportional fair metric, add another UE to the UE group. Furthermore, in addition to or in combination with any one of the features of this and/or the preceding two paragraphs with respect to apparatus 600, the first UE may include a single UE or a grouping of UEs awaiting transmission scheduling. Furthermore, in addition to or in combination with any one of the features of this and/or the preceding two paragraphs, processor 610 may be configured to select the second UE from a set of one or more candidate UEs awaiting transmission scheduling.

Furthermore, in addition to or in combination with any one of the features of this and/or the preceding three paragraphs with respect to apparatus 600, the characteristics may include at least one mobility characteristic of at least one UE in the UE group. Furthermore, in addition to or in combination with any one of the features of this and/or the preceding three paragraphs, the characteristics may include a total number of UEs in the UE group. Furthermore, in addition to or in combination with any one of the features of this and/or the preceding three paragraphs with respect to apparatus 600, the characteristics may include a total number of output streams of the beamforming algorithm. Furthermore, in addition to or in combination with any one of the features of this and/or the preceding three paragraphs with respect to apparatus 600, the characteristics may include a fronthaul throughput associated with the beamforming algorithm. Furthermore, in addition to or in combination with any one of the features of this and/or the preceding three paragraphs with respect to apparatus 600, the characteristics may include a computational complexity of the beamforming algorithm. Furthermore, in addition to or in combination with any one of the features of this and/or the preceding three paragraphs with respect to apparatus 600, the characteristics may include a dominant interference for transmissions of the UE group.

Furthermore, in addition to or in combination with any one of the features of this and/or the preceding four paragraphs, processor 610 may be configured to adjust the effective SINR based on a UE-specific factor of at least one UE in the UE group. Furthermore, in addition to or in combination with any one of the features of this and/or the preceding four paragraphs with respect to apparatus 600, the UE-specific factor is a SNR loss (dSNR) of the at least one UE. Furthermore, in addition to or in combination with any one of the features of this and/or the preceding four paragraphs, apparatus 600 may further include memory 620 configured to store a lookup table of possible beamforming algorithms, wherein the lookup table includes, for each possible beamforming algorithm, performance values corresponding to the characteristics. Furthermore, in addition to or in combination with any one of the features of this and/or the preceding four paragraphs, processor 610 may be configured to select the beamforming algorithm from the lookup table based on which of the possible beamforming algorithms fulfill a predefined optimization target for at least one of the performance values. Furthermore, in addition to or in combination with any one of the features of this and/or the preceding four paragraphs, processor 610 may be configured to update at least one of the performance values in the lookup table based on a measured packet error rate of at least one previously scheduled transmission. Furthermore, in addition to or in combination with any one of the features of this and/or the preceding four paragraphs with respect to apparatus 600, the predefined optimization target may include at least one of a spectral efficiency target, a computational complexity target, or a fronthaul throughput target.

Figure 7:
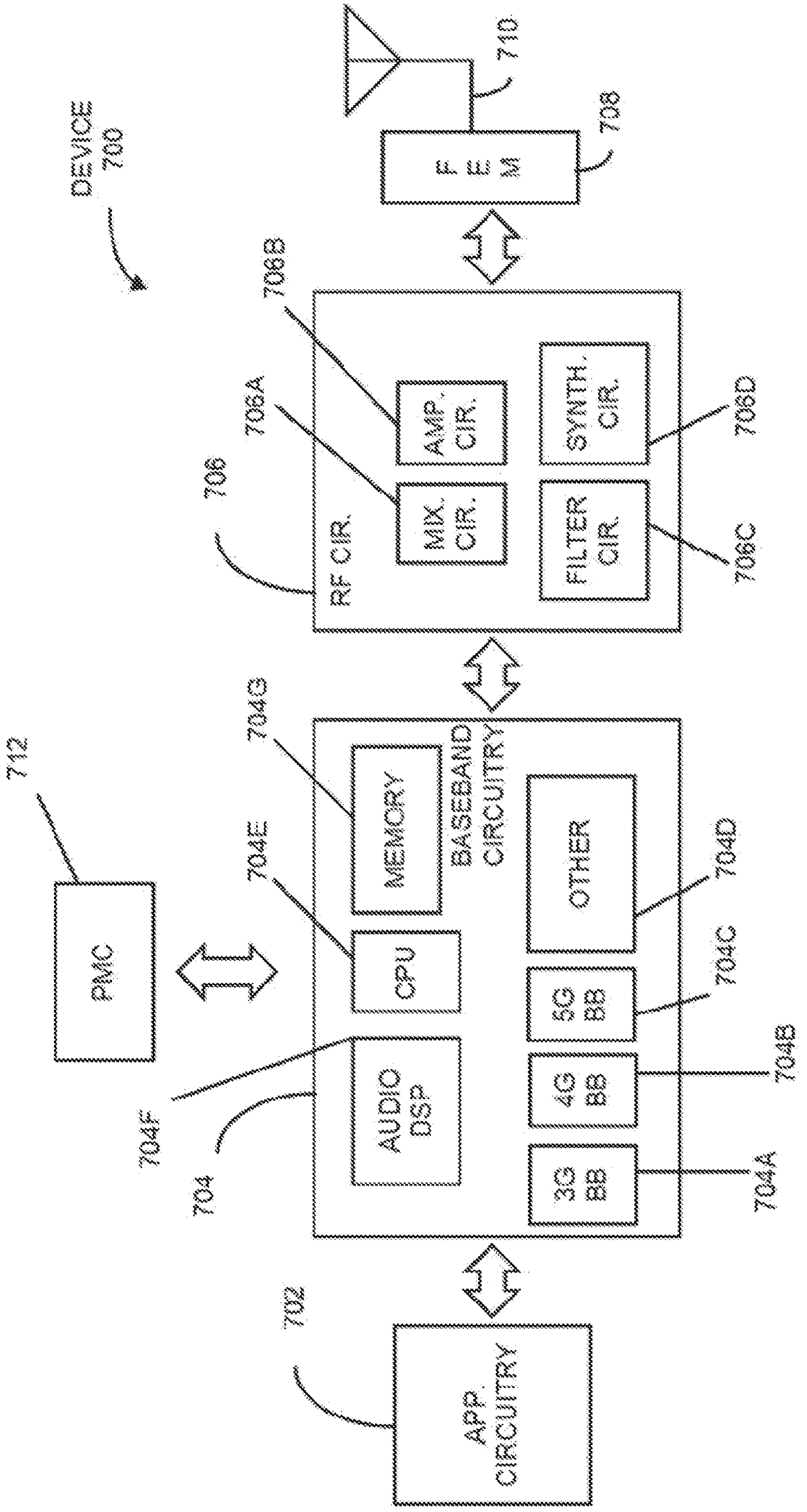
FIG. 7 shows a block diagram of example components of a device that may include optimizing spectral efficiency in a split processing architecture for 5G massive MIMO.

As should be appreciated from the description above, the disclosed spectral optimization system may be implemented using any combination of hardware and/or software. FIG. 7 shows a non-limiting example of a device 700 for providing a spectral optimization system in accordance with the description above. Device 700 may include application circuitry 702, baseband circuitry 704, Radio Frequency (RF) circuitry 706, front-end module (FEM) circuitry 708, one or more antennas 710, and power management circuitry (PMC) 712 that may be coupled together as shown. Device 700 may be included as part of and/or in a UE, a RAN node, or distributed among both. For example, device 700 may include fewer elements (e.g., a RAN node may not utilize application circuitry 702, and instead include a processor/controller to process internet-packet (IP) data received from an evolved packet core (EPC)). As another example, device 700 may include additional elements such as, for example, memory/storage, display, camera, sensor, or input/output (I/O) interface that are not necessarily depicted in FIG. 7. In addition, the components of device 700 may be distributed across more than one physical location (e.g., the components may be separately included in different cloud locations, e.g. for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/de-mapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706*a*, amplifier circuitry 706*b* and filter circuitry 706*c*. In some embodiments, the transmit signal path of the RF circuitry 706 may include filter circuitry 706*c* and mixer circuitry 706*a*. RF circuitry 706 may also include synthesizer circuitry 706*d* for synthesizing a frequency for use by the mixer circuitry 706*a* of the receive signal path and the transmit signal path. In some embodiments, the mixer circuitry 706*a* of the receive signal path may be configured to down-convert RF signals received from the FEM circuitry 708 based on the synthesized frequency provided by synthesizer circuitry 706*d*. The amplifier circuitry 706*b* may be configured to amplify the down-converted signals and the filter circuitry 706*c* may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706*a* of the receive signal path may comprise passive mixers, although the scope of the embodiments is not limited in this respect.

In some embodiments, the mixer circuitry 706*a* of the transmit signal path may be configured to up-convert input baseband signals based on the synthesized frequency provided by the synthesizer circuitry 706*d* to generate RF output signals for the FEM circuitry 708. The baseband signals may be provided by the baseband circuitry 704 and may be filtered by filter circuitry 706*c*.

In some embodiments, the mixer circuitry 706*a* of the receive signal path and the mixer circuitry 706*a* of the transmit signal path may include two or more mixers and may be arranged for quadrature downconversion and upconversion, respectively. In some embodiments, the mixer circuitry 706*a* of the receive signal path and the mixer circuitry 706*a* of the transmit signal path may include two or more mixers and may be arranged for image rejection (e.g., Hartley image rejection). In some embodiments, the mixer circuitry 706*a* of the receive signal path and the mixer circuitry 706*a* may be arranged for direct downconversion and direct upconversion, respectively. In some embodiments, the mixer circuitry 706*a* of the receive signal path and the mixer circuitry 706*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706*d* may be a fractional-N synthesizer or a fractional N/N+1 synthesizer, although the scope of the embodiments is not limited in this respect as other types of frequency synthesizers may be suitable. For example, synthesizer circuitry 706*d* may be a delta-sigma synthesizer, a frequency multiplier, or a synthesizer comprising a phase-locked loop with a frequency divider.

The synthesizer circuitry 706*d* may be configured to synthesize an output frequency for use by the mixer circuitry 706*a* of the RF circuitry 706 based on a frequency input and a divider control input. In some embodiments, the synthesizer circuitry 706*d* may be a fractional N/N+1 synthesizer.

In some embodiments, frequency input may be provided by a voltage-controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tuneable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a local oscillator (LO) frequency ($f_{LO}$). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

While FIG. 7 shows the PMC 712 coupled only with the baseband circuitry 704, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
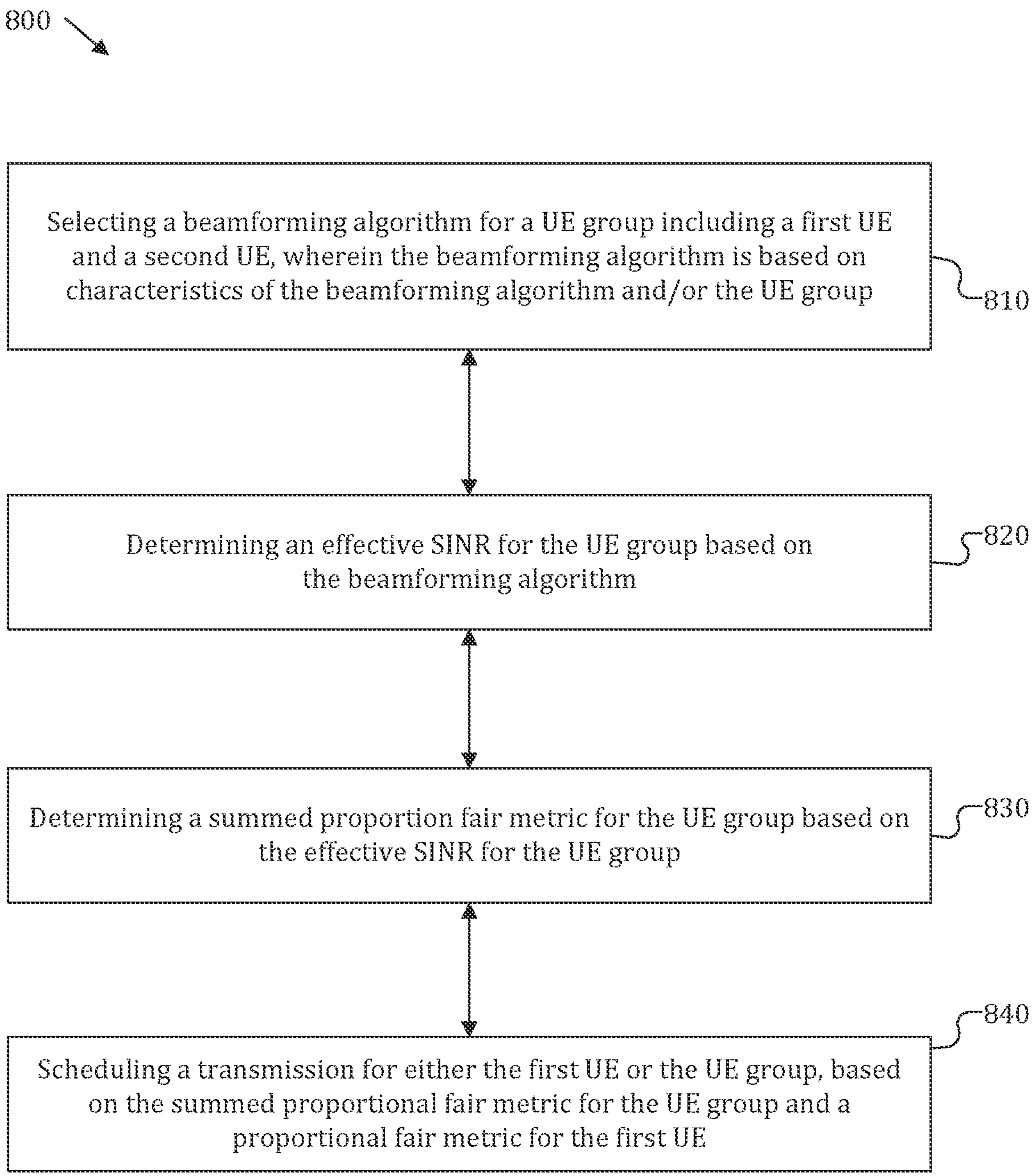
FIG. 8 depicts a schematic flow diagram of an exemplary method for optimizing spectral efficiency in a split processing architecture for 5G massive MIMO.

FIG. 8 depicts an exemplary schematic flow diagram of a method 800 that may provide a scheduling algorithm for a spectral optimization system. Without limitation, the method 800 may implement any, some, and/or all of the features described above with respect to architecture 100, processing chain 200, scheduler algorithm 300, architecture 400, scheduling algorithm 500, apparatus 600, device 700, and/or FIGS. 1-7.

Method 800 is a method for scheduling user equipment (UE) transmissions. The method 800 includes, in 810, selecting a beamforming algorithm for a UE group including a first UE and a second UE, wherein the beamforming algorithm is based on characteristics of the beamforming algorithm and/or the UE group. The method 800 also includes, in 820, determining an effective SINR for the UE group based on the beamforming algorithm. The method 800 also includes, in 830, determining a summed proportion fair metric for the UE group based on the effective SINR for the UE group. The method 800 also includes, in 840, scheduling a transmission for either the first UE or the UE group, based on the summed proportional fair metric for the UE group and a proportional fair metric for the first UE.

In the following, various examples are provided that may include one or more aspects described above with reference to features described above with respect to architecture 100, processing chain 200, scheduler algorithm 300, architecture 400, scheduling algorithm 500, apparatus 600, device 700, method 800, and/or FIGS. 1-8. The examples provided in relation to the devices may apply also to the described method(s), and vice versa.

Example 1 is an apparatus for scheduling user equipment (UE) transmissions. The apparatus includes a processor configured to select a beamforming algorithm for a UE group including a first UE and a second UE, wherein the beamforming algorithm is based on characteristics of the beamforming algorithm and/or the UE group. The processor is also configured to determine an effective signal-to-interference-plus-noise-ratio (SINR) for the UE group based on the beamforming algorithm. The processor is also configured to determine a summed proportion fair metric for the UE group based on the effective SINR for the UE group. The processor is also configured to schedule a transmission for either the first UE or the UE group, based on the summed proportional fair metric for the UE group and a proportional fair metric for the first UE.

Example 2 is the apparatus of example 1, wherein the transmission includes an uplink transmission from at least the first UE to a base station.

Example 3 is the apparatus of example 2, wherein the base station is part of a split architecture that splits radio hardware from baseband processing.

Example 4 is the apparatus of example 3, wherein the split architecture includes a 7-2 split architecture of an open radio access network (O-RAN).

Example 5 is the apparatus of any one of examples 1 to 4, wherein processor is configured to schedule the transmission on a per frequency resource basis.

Example 6 is the apparatus of any one of examples 1 to 5, wherein the processor is configured to schedule the transmission for either the first UE or the UE group, based on a comparison of the proportional fair metric for the first UE to the summed proportional fair metric for the UE group.

Example 7 is the apparatus of example 6, wherein the processor is configured to determine the comparison.

Example 8 is the apparatus of any one of examples 1 to 7, wherein the processor is configured to schedule the transmission for the first UE if the proportional fair metric is higher than the summed proportional fair metric.

Example 9 is the apparatus of any one of examples 1 to 8, wherein the processor is configured to schedule the transmission for the UE group if the summed proportional fair metric is higher than the proportional fair metric.

Example 10 is the apparatus of any one of examples 1 to 9, wherein the processor is configured to, if the summed proportional fair metric is higher than the proportional fair metric, add another UE to the UE group.

Example 11 is the apparatus of any one of examples 1 to 10, wherein the first UE includes a single UE or a grouping of UEs awaiting transmission scheduling.

Example 12 is the apparatus of any one of examples 1 to 11, wherein the processor is configured to select the second UE from a set of one or more candidate UEs awaiting transmission scheduling.

Example 13 is the apparatus of any one of examples 1 to 12, wherein the characteristics include at least one mobility characteristic of at least one UE in the UE group.

Example 14 is the apparatus of any one of examples 1 to 13, wherein the characteristics include a total number of UEs in the UE group.

Example 15 is the apparatus of any one of examples 1 to 14, wherein the characteristics include a total number of output streams of the beamforming algorithm.

Example 16 is the apparatus of any one of examples 1 to 15, wherein the characteristics include a fronthaul throughput associated with the beamforming algorithm.

Example 17 is the apparatus of any one of examples 1 to 16, wherein the characteristics include a computational complexity of the beamforming algorithm.

Example 18 is the apparatus of any one of examples 1 to 17, wherein the characteristics include a dominant interference for transmissions of the UE group.

Example 19 is the apparatus of any one of examples 1 to 18, wherein the processor is configured to adjust the effective SINR based on a UE-specific factor of at least one UE in the UE group.

Example 20 is the apparatus of example 19, wherein the UE-specific factor is a SNR loss (dSNR) of the at least one UE.

Example 21 is the apparatus of any one of examples 1 to 20, further including a memory configured to store a lookup table of possible beamforming algorithms, wherein the lookup table includes, for each possible beamforming algorithm, performance values corresponding to the characteristics.

Example 22 is the apparatus of example 21, wherein the processor is configured to select the beamforming algorithm from the lookup table based on which of the possible beamforming algorithms fulfill a predefined optimization target for at least one of the performance values.

Example 23 is the apparatus of either of examples 21 or 22, wherein the processor is configured to update at least one of the performance values in the lookup table based on a measured packet error rate of at least one previously scheduled transmission.

Example 24 is the apparatus of either of examples 22 or 23, wherein the predefined optimization target includes at least one of a spectral efficiency target, a computational complexity target, or a fronthaul throughput target.

Example 25 is a method for scheduling user equipment (UE) transmissions. The method includes selecting a beamforming algorithm for a UE group including a first UE and a second UE, wherein the beamforming algorithm is based on characteristics of the beamforming algorithm and/or the UE group. The method also includes determining an effective signal-to-interference-plus-noise-ratio (SINK) for the UE group based on the beamforming algorithm. The method also includes determining a summed proportion fair metric for the UE group based on the effective SINR for the UE group. The method also includes scheduling a transmission for either the first UE or the UE group, based on the summed proportional fair metric for the UE group and a proportional fair metric for the first UE.

Example 26 is the method of example 25, wherein the transmission includes an uplink transmission from at least the first UE to a base station.

Example 27 is the method of example 26, wherein the base station is part of a split architecture that splits radio hardware from baseband processing.

Example 28 is the method of example 27, wherein the split architecture includes a 7-2 split architecture of an open radio access network (O-RAN).

Example 29 is the method of any one of examples 25 to 28, wherein scheduling the transmission includes scheduling the transmission on a per frequency resource basis.

Example 30 is the method of any one of examples 25 to 29, wherein scheduling the transmission includes scheduling the transmission for either the first UE or the UE group, based on a comparison of the proportional fair metric for the first UE to the summed proportional fair metric for the UE group.

Example 31 is the method of example 30, the method further including determining the comparison.

Example 32 is the method of any one of examples 25 to 31, wherein scheduling the transmission includes scheduling the transmission for the first UE if the proportional fair metric is higher than the summed proportional fair metric.

Example 33 is the method of any one of examples 25 to 32, wherein scheduling the transmission includes scheduling the transmission for the UE group if the summed proportional fair metric is higher than the proportional fair metric.

Example 34 is the method of any one of examples 25 to 33, wherein the method includes, if the summed proportional fair metric is higher than the proportional fair metric, adding another UE to the UE group.

Example 35 is the method of any one of examples 25 to 34, wherein the first UE includes a single UE or a grouping of UEs awaiting transmission scheduling.

Example 36 is the method of any one of examples 25 to 35, the method further includes selecting the second UE from a set of one or more candidate UEs awaiting transmission scheduling.

Example 37 is the method of any one of examples 25 to 36, wherein the characteristics include at least one mobility characteristic of at least one UE in the UE group.

Example 38 is the method of any one of examples 25 to 37, wherein the characteristics include a total number of UEs in the UE group.

Example 39 is the method of any one of examples 25 to 38, wherein the characteristics include a total number of output streams of the beamforming algorithm.

Example 40 is the method of any one of examples 25 to 39, wherein the characteristics include a fronthaul throughput associated with the beamforming algorithm.

Example 41 is the method of any one of examples 25 to 40, wherein the characteristics include a computational complexity of the beamforming algorithm.

Example 42 is the method of any one of examples 25 to 41, wherein the characteristics include a dominant interference for transmissions of the UE group.

Example 43 is the method of any one of examples 25 to 42, the method further including adjusting the effective SINR based on a UE-specific factor of at least one UE in the UE group.

Example 44 is the method of example 43, wherein the UE-specific factor is a SNR loss (dSNR) of the at least one UE.

Example 45 is the method of any one of examples 25 to 44, the method further including storing (e.g. in a memory) a lookup table of possible beamforming algorithms, wherein the lookup table includes, for each possible beamforming algorithm, performance values corresponding to the characteristics.

Example 46 is the method of example 45, the method further includes selecting the beamforming algorithm from the lookup table based on which of the possible beamforming algorithms fulfill a predefined optimization target for at least one of the performance values.

Example 47 is the method of either of examples 45 or 46, the method further includes updating at least one of the performance values in the lookup table based on a measured packet error rate of at least one previously scheduled transmission.

Example 48 is the method of either of examples 46 or 47, wherein the predefined optimization target includes at least one of a spectral efficiency target, a computational complexity target, or a fronthaul throughput target.

Example 49 is a device for scheduling user equipment (UE) transmissions. The device includes a means for selecting a beamforming algorithm for a UE group including a first UE and a second UE, wherein the beamforming algorithm is based on characteristics of the beamforming algorithm and/or the UE group. The device also includes a means for determining an effective signal-to-interference-plus-noise-ratio (SINR) for the UE group based on the beamforming algorithm. The device also includes a means for determining a summed proportion fair metric for the UE group based on the effective SINR for the UE group. The device also includes a means for scheduling a transmission for either the first UE or the UE group, based on the summed proportional fair metric for the UE group and a proportional fair metric for the first UE.

Example 50 is the device of example 49, wherein the transmission includes an uplink transmission from at least the first UE to a base station.

Example 51 is the device of example 50, wherein the base station is part of a split architecture that splits radio hardware from baseband processing.

Example 52 is the device of example 51, wherein the split architecture includes a 7-2 split architecture of an open radio access network (O-RAN).

Example 53 is the device of any one of examples 49 to 52, wherein the device also includes a means for scheduling the transmission on a per frequency resource basis.

Example 54 is the device of any one of examples 49 to 53, wherein the device also includes a means for scheduling the transmission for either the first UE or the UE group, based on a comparison of the proportional fair metric for the first UE to the summed proportional fair metric for the UE group.

Example 55 is the device of example 54, wherein the device also includes a means for determining the comparison.

Example 56 is the device of any one of examples 49 to 55, wherein the device also includes a means for scheduling the transmission for the first UE if the proportional fair metric is higher than the summed proportional fair metric.

Example 57 is the device of any one of examples 49 to 56, wherein the device also includes a means for scheduling the transmission for the UE group if the summed proportional fair metric is higher than the proportional fair metric.

Example 58 is the device of any one of examples 49 to 57, wherein the device also includes a means for adding another UE to the UE group if the summed proportional fair metric is higher than the proportional fair metric.

Example 59 is the device of any one of examples 49 to 58, wherein the first UE includes a single UE or a grouping of UEs awaiting transmission scheduling.

Example 60 is the device of any one of examples 49 to 59, wherein the device also includes a means for selecting the second UE from a set of one or more candidate UEs awaiting transmission scheduling.

Example 61 is the device of any one of examples 49 to 60, wherein the characteristics include at least one mobility characteristic of at least one UE in the UE group.

Example 62 is the device of any one of examples 49 to 61, wherein the characteristics include a total number of UEs in the UE group.

Example 63 is the device of any one of examples 49 to 62, wherein the characteristics include a total number of output streams of the beamforming algorithm.

Example 64 is the device of any one of examples 49 to 63, wherein the characteristics include a fronthaul throughput associated with the beamforming algorithm.

Example 65 is the device of any one of examples 49 to 64, wherein the characteristics include a computational complexity of the beamforming algorithm.

Example 66 is the device of any one of examples 49 to 65, wherein the characteristics include a dominant interference for transmissions of the UE group.

Example 67 is the device of any one of examples 49 to 66, wherein the device also includes a means for adjusting the effective SINR based on a UE-specific factor of at least one UE in the UE group.

Example 68 is the device of example 67, wherein the UE-specific factor is a SNR loss (dSNR) of the at least one UE.

Example 69 is the device of any one of examples 49 to 68, wherein the device also includes a means for storing a lookup table of possible beamforming algorithms, wherein the lookup table includes, for each possible beamforming algorithm, performance values corresponding to the characteristics.

Example 70 is the device of example 69, wherein the device also includes a means for selecting the beamforming algorithm from the lookup table based on which of the possible beamforming algorithms fulfill a predefined optimization target for at least one of the performance values.

Example 71 is the device of either of examples 69 or 70, wherein the device also includes a means for updating at least one of the performance values in the lookup table based on a measured packet error rate of at least one previously scheduled transmission.

Example 72 is the device of either of examples 70 or 71, wherein the predefined optimization target includes at least one of a spectral efficiency target, a computational complexity target, or a fronthaul throughput target.

Example 73 is a non-transitory computer readable medium for scheduling user equipment (UE) transmissions, wherein the non-transitory computer readable medium includes instructions which, if executed, cause one or more processors to select a beamforming algorithm for a UE group including a first UE and a second UE, wherein the beamforming algorithm is based on characteristics of the beamforming algorithm and/or the UE group. The instructions also cause the one or more processors to determine an effective signal-to-interference-plus-noise-ratio (SINR) for the UE group based on the beamforming algorithm. The instructions also cause the one or more processors to determine a summed proportion fair metric for the UE group based on the effective SINR for the UE group. The instructions also cause the one or more processors to schedule a transmission for either the first UE or the UE group, based on the summed proportional fair metric for the UE group and a proportional fair metric for the first UE.

Example 74 is the non-transitory computer readable medium of example 73, wherein the transmission includes an uplink transmission from at least the first UE to a base station.

Example 75 is the non-transitory computer readable medium of example 74, wherein the base station is part of a split architecture that splits radio hardware from baseband processing.

Example 76 is the non-transitory computer readable medium of example 75, wherein the split architecture includes a 7-2 split architecture of an open radio access network (O-RAN).

Example 77 is the non-transitory computer readable medium of any one of examples 73 to 76, wherein the instructions also cause the one or more processors to schedule the transmission on a per frequency resource basis.

Example 78 is the non-transitory computer readable medium of any one of examples 73 to 77, wherein the instructions also cause the one or more processors to schedule the transmission for either the first UE or the UE group, based on a comparison of the proportional fair metric for the first UE to the summed proportional fair metric for the UE group.

Example 79 is the non-transitory computer readable medium of example 78, wherein the instructions also cause the one or more processors to determine the comparison.

Example 80 is the non-transitory computer readable medium of any one of examples 73 to 79, wherein the instructions also cause the one or more processors to schedule the transmission for the first UE if the proportional fair metric is higher than the summed proportional fair metric.

Example 81 is the non-transitory computer readable medium of any one of examples 73 to 80, wherein the instructions also cause the one or more processors to schedule the transmission for the UE group if the summed proportional fair metric is higher than the proportional fair metric.

Example 82 is the non-transitory computer readable medium of any one of examples 73 to 81, wherein the instructions also cause the one or more processors to, if the summed proportional fair metric is higher than the proportional fair metric, add another UE to the UE group.

Example 83 is the non-transitory computer readable medium of any one of examples 73 to 82, wherein the first UE includes a single UE or a grouping of UEs awaiting transmission scheduling.

Example 84 is the non-transitory computer readable medium of any one of examples 73 to 83, wherein the instructions also cause the one or more processors to select the second UE from a set of one or more candidate UEs awaiting transmission scheduling.

Example 85 is the non-transitory computer readable medium of any one of examples 73 to 84, wherein the characteristics include at least one mobility characteristic of at least one UE in the UE group.

Example 86 is the non-transitory computer readable medium of any one of examples 73 to 85, wherein the characteristics include a total number of UEs in the UE group.

Example 87 is the non-transitory computer readable medium of any one of examples 73 to 86, wherein the characteristics include a total number of output streams of the beamforming algorithm.

Example 88 is the non-transitory computer readable medium of any one of examples 73 to 87, wherein the characteristics include a fronthaul throughput associated with the beamforming algorithm.

Example 89 is the non-transitory computer readable medium of any one of examples 73 to 88, wherein the characteristics include a computational complexity of the beamforming algorithm.

Example 90 is the non-transitory computer readable medium of any one of examples 73 to 89, wherein the characteristics include a dominant interference for transmissions of the UE group.

Example 91 is the non-transitory computer readable medium of any one of examples 73 to 90, wherein the instructions also cause the one or more processors to adjust the effective SINR based on a UE-specific factor of at least one UE in the UE group.

Example 92 is the non-transitory computer readable medium of example 91, wherein the UE-specific factor is a SNR loss (dSNR) of the at least one UE.

Example 93 is the non-transitory computer readable medium of any one of examples 73 to 92, further including a memory configured to store a lookup table of possible beamforming algorithms, wherein the lookup table includes, for each possible beamforming algorithm, performance values corresponding to the characteristics.

Example 94 is the non-transitory computer readable medium of example 93, wherein the instructions also cause the one or more processors to select the beamforming algorithm from the lookup table based on which of the possible beamforming algorithms fulfill a predefined optimization target for at least one of the performance values.

Example 95 is the non-transitory computer readable medium of either of examples 93 or 94, wherein the instructions also cause the one or more processors to update at least one of the performance values in the lookup table based on a measured packet error rate of at least one previously scheduled transmission.

Example 96 is the non-transitory computer readable medium of either of examples 94 or 95, wherein the predefined optimization target includes at least one of a spectral efficiency target, a computational complexity target, or a fronthaul throughput target.

As should be further understood, the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several functions to a certain order. Furthermore, in further examples, a single function, process, or operation may include and/or be broken up into several sub-functions, sub-processes, or sub-operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

While the disclosure has been particularly shown and described with reference to exemplary apparatuses and methods, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An apparatus for scheduling user equipment (UE) transmissions, the apparatus comprising a processor configured to:

select a beamforming compression algorithm for a UE group comprising a first UE and a second UE, wherein the beamforming compression algorithm is based on characteristics of the beamforming compression algorithm and/or the UE group, wherein the beamforming compression algorithm is selected from a plurality of candidate beamforming compression algorithms stored in a lookup table, wherein the lookup table stores, for each candidate beamforming compression algorithm and for a set of UE group characteristics, a signal-to-noise ratio loss (dSNR) value corresponding to the candidate beamforming compression algorithm and to the set of UE group characteristics;

determine an initial signal-to-interference-plus-noise-ratio (SINR) estimate for the UE group based on the beamforming compression algorithm;

determine an effective SINR estimate for the UE group based on the initial SINR estimate adjusted by the dSNR value from the lookup table corresponding to the beamforming compression algorithm selected for the UE group and to the set of UE group characteristics of the UE group;

determine a summed proportional fair metric for the UE group based on the effective SINR for the UE group; and schedule a transmission for either the first UE or the UE group, based on the summed proportional fair metric for the UE group and a proportional fair metric for the first UE.

2. The apparatus of claim 1, wherein the transmission comprises an uplink transmission from at least the first UE to a base station.

3. The apparatus of claim 2, wherein the base station is part of a split architecture that splits radio hardware from baseband processing, wherein the split architecture comprises a 7-2 split architecture of an open radio access network (O-RAN).

4. The apparatus of claim 1, wherein the processor is configured to schedule the transmission for the first UE if the proportional fair metric is higher than the summed proportional fair metric.

5. The apparatus of claim 1, wherein the processor is configured to schedule the transmission for the UE group if the summed proportional fair metric is higher than the proportional fair metric.

6. The apparatus of claim 1, wherein the processor is configured to, if the summed proportional fair metric is higher than the proportional fair metric, add another UE to the UE group.

7. The apparatus of claim 1, wherein the first UE comprises a single UE or a grouping of UEs awaiting transmission scheduling.

8. The apparatus of claim 1, wherein the processor is configured to select the second UE from a set of one or more candidate UEs awaiting transmission scheduling.

9. The apparatus of claim 1, wherein the characteristics comprise at least one mobility characteristic of at least one UE in the UE group.

10. The apparatus of claim 1, wherein the characteristics comprise a total number of UEs in the UE group.

11. The apparatus of claim 1, wherein the characteristics comprise a total number of output streams of the beamforming compression algorithm.

12. The apparatus of claim 1, wherein the characteristics comprise a fronthaul throughput associated with the beamforming compression algorithm.

13. The apparatus of claim 1, wherein the characteristics comprise a computational complexity of the beamforming compression algorithm.

14. The apparatus of claim 1, wherein the characteristics comprise a dominant interference for transmissions of the UE group.

15. The apparatus of claim 1, wherein the processor is configured to adjust the effective SINR based on a UE-specific factor of at least one UE in the UE group, wherein the UE-specific factor is a SNR loss (dSNR) of the at least one UE.

16. A non-transitory computer readable medium for scheduling user equipment (UE) transmissions in a 5G split architecture, wherein the non-transitory computer readable medium includes instructions which, if executed, cause one or more processors to:

select a beamforming compression algorithm for a UE group comprising a first UE and a second UE, wherein the beamforming compression algorithm is based on characteristics of the beamforming compression algorithm and/or the UE group, wherein the beamforming compression algorithm is selected from a plurality of candidate beamforming compression algorithms stored in a lookup table, wherein the lookup table stores, for each candidate beamforming compression algorithm and for a set of UE group characteristics, a signal-to-noise ratio loss (dSNR) value corresponding to the candidate beamforming compression algorithm and to the set of UE group characteristics;

determine an initial signal-to-interference-plus-noise-ratio (SINR) estimate for the UE group based on the beamforming compression algorithm;

determine an effective SINR estimate for the UE group based on the initial SINR estimate adjusted by the dSNR value from the lookup table corresponding to the beamforming compression algorithm selected for the UE group and to the set of UE group characteristics of the UE group;

determine a summed proportional fair metric for the UE group based on the effective SINR for the UE group; and schedule a transmission for either the first UE or the UE group, based on the summed proportional fair metric for the UE group and a proportional fair metric for the first UE.

17. The non-transitory computer readable medium of claim 16, wherein the processor is configured to select the beamforming compression algorithm from the lookup table based on which of the possible beamforming compression algorithms fulfill a predefined optimization target for at least one of the performance values.

18. The non-transitory computer readable medium of claim 17, wherein the predefined optimization target comprises at least one of a spectral efficiency target, a computational complexity target, or a fronthaul throughput target.

19. The non-transitory computer readable medium of claim 16, wherein the processor is configured to update at least one of the performance values in the lookup table based on a measured packet error rate of at least one previously scheduled transmission.

* * * * *